United States Patent
Dodsworth et al.

(10) Patent No.: US 10,145,414 B2
(45) Date of Patent: Dec. 4, 2018

(54) REFRACTORY BEARING

(71) Applicant: McDanel Advanced Ceramic Technologies, Beaver Falls, PA (US)

(72) Inventors: John Dodsworth, Beaver Falls, PA (US); Mark Hall, New Castle, PA (US); Kim Rheingrover, Aliquippa, PA (US)

(73) Assignee: McDanel Advanced Ceramic Technologies, Beaver Falls, PA (US)

( * ) Notice: Subject to any disclaimer, the term of this patent is extended or adjusted under 35 U.S.C. 154(b) by 0 days.

(21) Appl. No.: 15/737,130

(22) PCT Filed: Jun. 15, 2016

(86) PCT No.: PCT/US2016/037602
§ 371 (c)(1),
(2) Date: Dec. 15, 2017

(87) PCT Pub. No.: WO2016/205352
PCT Pub. Date: Dec. 22, 2016

(65) Prior Publication Data
US 2018/0172074 A1 Jun. 21, 2018

Related U.S. Application Data

(60) Provisional application No. 62/175,696, filed on Jun. 15, 2015.

(51) Int. Cl.
*F16C 33/04* (2006.01)
*F16C 33/14* (2006.01)
(Continued)

(52) U.S. Cl.
CPC ............ *F16C 33/043* (2013.01); *C23C 2/003* (2013.01); *C23C 2/40* (2013.01); *F16C 13/02* (2013.01);
(Continued)

(58) Field of Classification Search
CPC ...................................... F16C 33/043
See application file for complete search history.

(56) References Cited

U.S. PATENT DOCUMENTS 3,711,171 A * 1/1973 Orkin ........................ C23C 4/04
384/202
5,099,780 A 3/1992 Napier
(Continued)

*Primary Examiner* — Thomas R Hannon
(74) *Attorney, Agent, or Firm* — James R. Williams

(57) ABSTRACT

At least one bearing insert is secured within a metallic housing to form a wear resistant bearing. In operation, the bearing insert engages a journal and provides a wear-resistant surface. The housing defines a cavity for receiving the bearing insert. The cavity preferably expands radially so that the bearing insert remains secured in the cavity. The bearing insert can comprise a refractory ceramic. The bearing insert is secured within the cavity by any suitable means, such as thermal shrink-fit. A thin layer of sacrificial metal protects the bearing insert during initial start-up. The sacrificial metal wears to expose the bearing insert. Further wear exposes a larger area of the refractory bearing insert. A second bearing insert can be disposed opposite to the first so that rotating the housing can expose the second bearing insert to the journal.

14 Claims, 4 Drawing Sheets

(51) Int. Cl.
*C23C 2/00* (2006.01)
*C23C 2/40* (2006.01)
*F16C 13/02* (2006.01)
*F16C 33/08* (2006.01)
*F16C 17/02* (2006.01)
*F16C 33/10* (2006.01)

(52) U.S. Cl.
CPC .............. *F16C 33/08* (2013.01); *F16C 33/14* (2013.01); *F16C 17/02* (2013.01); *F16C 33/109* (2013.01); *F16C 2223/40* (2013.01); *F16C 2231/00* (2013.01)

(56) References Cited

U.S. PATENT DOCUMENTS

| | | |
|---|---|---|
| 5,667,310 A | 9/1997 | Oyagi |
| 5,711,613 A | 1/1998 | Ookouchi et al. |
| 2002/0181812 A1 | 12/2002 | Nishizaka |
| 2003/0133632 A1 | 7/2003 | Hall |
| 2018/0002796 A1* | 1/2018 | Niedringhaus ......... C04B 35/18 |

\* cited by examiner

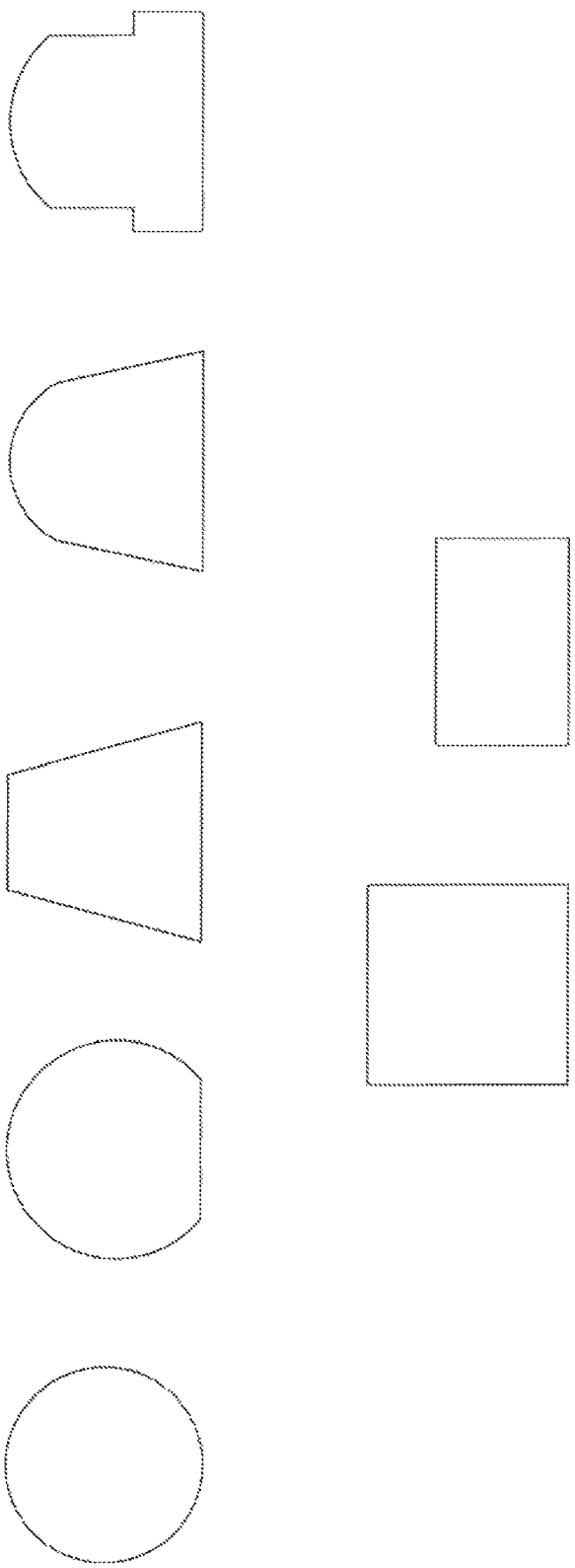

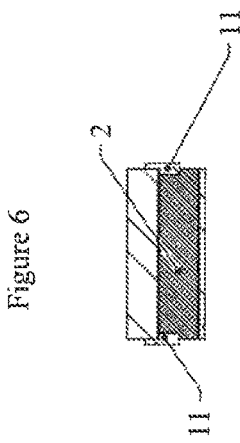
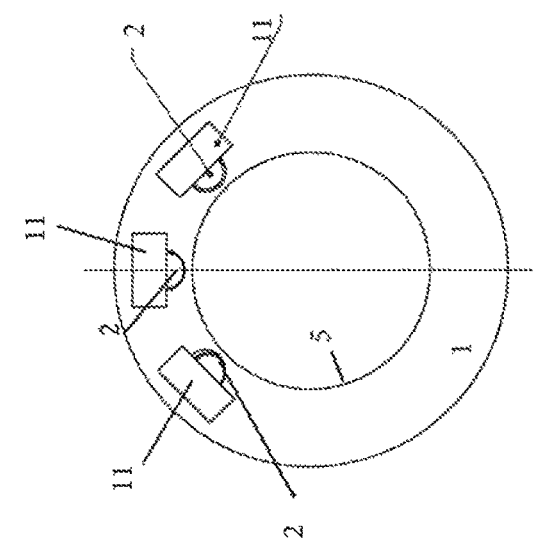

REFRACTORY BEARING

The application claims priority to U.S. Provisional Patent Application 62/175,696 filed 15 Jun. 2015, and PCT/US2016/037602 filed 15 Jun. 2016.

FIELD OF THE INVENTION

The invention relates to a refractory bearing and in particular to a bearing for use in contact with molten metal.

BACKGROUND OF THE INVENTION

Bearings typically support a rotating or otherwise moving article, such as a journal or roll. In high temperature applications, bearings often comprise a refractory metal, ceramic or composite. In such applications, bearings may even be in direct contact with molten metals, such as molten zinc or aluminum.

Applications include galvanization, which is the process of forming a protective, anti-oxidant zinc layer on a base metal. A continuous galvanizing apparatus comprises a bath of molten zinc with a sink roll at least partially immersed in the bath. The bath is maintained at a temperature sufficient to keep the zinc molten. A housing at each longitudinal end of the sink roll include at least one refractory bearing. The refractory bearing includes a wear surface that supports the sink roll. The sink roll forces the base metal, which is often in the form of a sheet or wire, into the molten zinc. The sink roll rotates against the wear surface of the refractory bearing as the base metal passes into the molten zinc, under the sink roll, and finally out of the molten zinc.

The requirements for refractory bearings can be severe. Molten zinc is at least 420° C., typically around 460° C., and corrodes many common bearing materials. Mechanical abrasion is a persistent complication. The bearings can wear quickly and must be replaced frequently. Replacement requires the shutdown of the galvanizing operation while new bearings are inserted. Disruption of a continuous galvanizing operation results in significant operator costs and lost production.

Prior art bearings include metal housings, often in the shape of a ring. During operation, the roll contacts a working face of the refractory bearing. The high temperature and corrosive environment destroy metal bearings relatively quickly and cause the sink roll to rotate eccentrically, thereby reducing galvanizing efficiency. Worn bearings must be replaced, often at great cost. Prior art also includes metal housings having inserts comprising a refractory material selected for its erosion and corrosion resistance. The roll contacts the inserts instead of the metal housing. The inserts are substantially more resistant to wear and corrosion than the metal housing alone and can extend the life of bearings many times. Typically, the inserts are polygonal shapes and are embedded in a plurality of cavities along the working face of the metal housing.

At room temperature, the inserts are secured tightly into the cavities. This may be accomplished using a retaining plate and one or more wedges to improve the tightness of fit. The retaining plate can be welded to the housing and may extend at least partially over the insert in the cavity. Still, inserts have a tendency to fall out at operating temperatures because the thermal expansion of the metal housing is greater than the ceramic inserts. Loss of an insert causes the journal to wobble or otherwise rotate eccentrically. Fortunately, the journals pressing against the inserts can hold the inserts in the cavities despite thermal expansion; however, pressure can be lost when the galvanizing operation is stopped or slowed. In such situations, the journal may separate from the insert sufficiently to permit the insert to fall from its cavity. The tendency of a ceramic insert to loosen and fall from a metal cavity increases with temperature and would be even more likely at higher temperatures, such as with molten aluminum baths which are typically at least around 700° C. and more commonly around 715° C.

A need persists for a refractory bearing comprising a housing and a wear-resistant insert where the insert is fixedly secured to the housing without the need for a retaining plate. Advantageously, the bearing would be easily manufactured of substantially inexpensive materials and would be suitable for use with molten zinc and aluminum.

SUMMARY OF THE INVENTION

The object of this invention is to provide a refractory bearing having superior wear resistance at a lower manufacturing cost. The refractory bearing includes a housing and at least one bearing insert. The housing may comprise a hollow cylinder having an inner surface defining at least one cavity for receiving the bearing insert. The cavity enlarges radially and can be separated from the inner surface by a sacrificial layer. The bearing insert can be of any shape but conveniently is cylindrical. In operation, a journal or roll can engage the housing and contact the refractory bearing.

A further objective of this invention is to preserve the bearing insert during start-up. Another object of the invention is to permit multiple configurations for various manufacturing configurations. Another object of the invention is permit multiple bearing sets in a single housing so that downtime for bearing changes is reduced.

BRIEF DESCRIPTION OF THE DRAWING

FIG. 4 shows alternative refractory shapes.

FIG. 5 is a longitudinal view of an alternative embodiment having a housing with refractory inserts.

FIG. 6 is a cross-sectional view of the insert of FIG. 5.

DETAILED DESCRIPTION OF THE INVENTION

Figure 3:
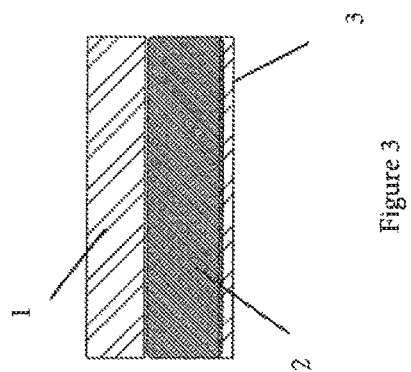
FIG. 3 is a magnification of FIG. 2.
Figure 2:
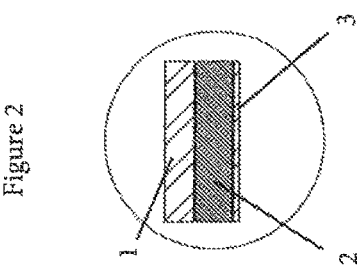
FIG. 2 is a cross-sectional view of the insert of FIG. 1.
Figure 1:
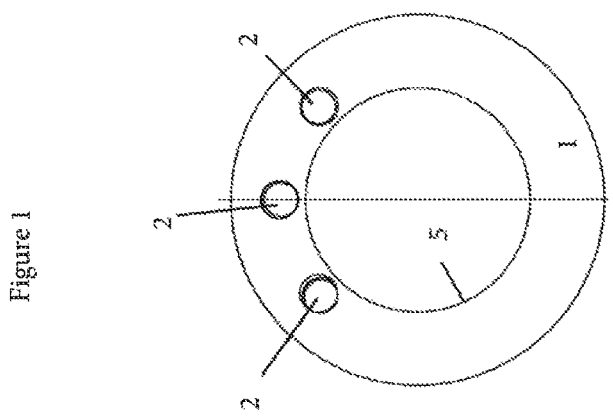
FIG. 1 is a longitudinal view of a housing with refractory inserts of the present invention.

FIGS. 1-3 show a housing 1 having an inner surface 5 with a bearing insert 2 embedded just below the inner surface 5 so that a thin sacrificial layer 3 is between the bearing insert 2 and the inner surface 5. The housing can comprise a cylinder. The housing 1 can comprise a temperature- and chemical-resistant metal such as, for example, type 316L stainless steel. The housing 1 can receive a roll or journal capable of rotation. The bearing insert 2 can comprise a suitable refractory ceramic such as, for example, sialon or zirconia. FIG. 1 shows a plurality of bearing inserts 2. The bearing inserts 2 are placed just below the inner surface 5 of the housing 1 so that the inserts 2 are covered by the sacrificial layer 3. The sacrificial layer 3 between the inside surface 5 of the housing and the bearing insert 2 is "sacrificial", i.e. it is quickly consumed by contact with the rotating roll or journal. The sacrificial layer 3 protects the bearing insert 2 during initial startup. The sacrificial layer will be less than about 5 mm thick and preferably less than about 1 mm.

The bearing insert will be placed in a cavity defined by the housing. The cavity will enlarge radially so that the bearing insert remains secured in the cavity, especially as wear occurs, and reduces the likelihood that the bearing insert will fall out. Conveniently, the bearing inserts can be cylindrical or other suitable cross-sections. A cylindrical shape facilitates production of the bearing inserts and requires little tooling before use. For example, refractory ceramics are commonly extruded in tubular form as smooth cylinders. The invention anticipates, however, that other shapes could be used such as shown in FIG. 4.

In an embodiment, the bearing insert is shrink-fitted into a cavity of the housing to provide additional fixity in service. This technique is beneficial when the bearing insert has a lower thermal expansion coefficient than the housing. For example, a typical refractory ceramic will expand less than a metal. Heating the metal housing will increase the size of the cavity and subsequent shrinkage when the housing decreases in temperature will increase the frictional fit of this embodiment.

FIG. 5 shows an alternative embodiment. The bearing inserts 2 are constrained with a positive mechanical interlock 11. The mechanical interlock can include a plate welded to the end of the housing 1. See longitudinal cross-section in FIG. 6. In an embodiment, a relief cut (not shown) is made into the housing and the retainer can be secured to the housing inside this relief cut.

Figure 9:
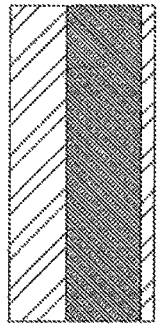
FIG. 9 is a magnification of FIG. 8.
Figure 8:
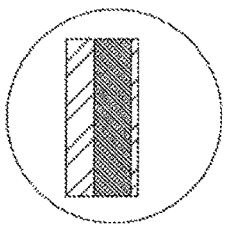
FIG. 8 is a cross-sectional view of the insert of FIG. 7.
Figure 7:
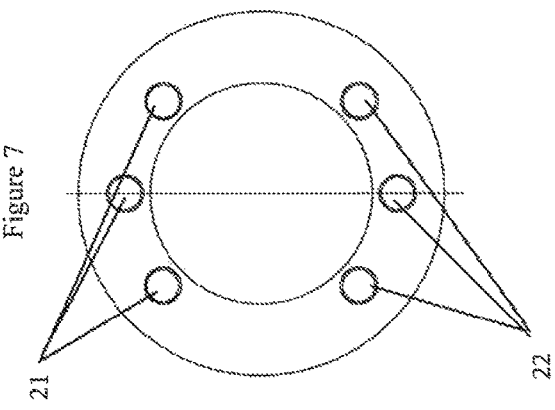
FIG. 7 is a longitudinal view of an alternative embodiment having a housing with refractory inserts.

FIGS. 7-9 show an alternative embodiment in which the housing includes a plurality of sets of bearing inserts, namely a first bearing insert 21 and an opposite bearing insert 22. As shown, the first bearing insert and the opposite bearing insert both comprise a plurality of inserts. The first bearing 21 will wear, and conveniently the housing can be rotated so that the opposite bearing insert 22 engages the roll or journal. The sacrificial layer has preserved the opposite bearing insert when not in use. This feature permits, for example, multiple galvanizing campaigns from a single housing thereby reducing production downtime.

A cylindrical profile reduces costs and necessary parts. Additionally, modified configurations permit additional curvature coverage for special cases where angle of force changes during operation.

The invention claimed is:

1. A refractory bearing comprising:
   a) at least one bearing insert comprising a refractory material; and
   b) a housing having a radius and an inner surface, the inner surface defining at least one cavity for receiving the bearing insert, the cavity separated from the inner surface by a sacrificial layer.

2. The refractory bearing of claim 1, characterized by the bearing insert comprising a refractory ceramic.

3. The refractory bearing of claim 2, characterized by the refractory ceramic selected from a group consisting of sialon, zirconia, and combinations thereof.

4. The refractory bearing of claim 1, characterized by the housing comprising a cylinder.

5. The refractory bearing of claim 1, characterized by the cavity enlarging radially, whereby the bearing insert is secured in the cavity.

6. The refractory bearing of claim 1, characterized by the cavity defining a cylindrical shape and the bearing insert comprising a cylinder.

7. The refractory bearing of claim 1, characterized by the housing defining a plurality of cavities for a plurality of bearing inserts.

8. The refractory bearing of claim 7, characterized by the plurality of bearings comprising a first bearing insert and an opposite bearing insert, the opposite bearing insert disposed on the inner surface opposite to the first bearing insert.

9. The refractory bearing of claim 8, characterized by the first bearing insert comprising a plurality of bearing inserts.

10. The refractory bearing of claim 8, characterized by the opposite bearing insert comprising a plurality of bearing inserts.

11. The refractory bearing of claim 1, characterized by the bearing insert being shrink-fitted into the cavity.

12. The refractory bearing of claim 1, characterized by the bearing insert secured in the cavity by a positive mechanical interlock.

13. The refractory bearing of claim 1, characterized by the sacrificial layer being less than 5 mm thick.

14. The refractory bearing of claim 1, characterized by the sacrificial layer being less than 1 mm thick.

* * * * *